Patented Nov. 11, 1930

1,781,636

UNITED STATES PATENT OFFICE

IRMA HUYS VANDER GHEYNST, OF NEW YORK, N. Y.

CANDY

No Drawing.   Application filed December 13, 1927.   Serial No. 239,811.

This invention relates to confections and has particular reference to an improved candy and method of producing the same.

It is a well-known fact that the juices of certain vegetables contain medicinal values which are of a special benefit to children as well as to adults, but due to the fact that many of said vegetables, especially green vegetables, are unpalatable, it is difficult to induce children to eat the same.

The present invention, therefore, comprehends a confection or candy in which the juices or extractive matters of certain vegetables are incorporated in such a manner as to retain the valuable mineral salts and vitamins without lending unpalatable taste or flavors.

The invention furthermore contemplates a method or process of producing a confection or candy in which green vegetable juices are incorporated in such a manner as to disguise or conceal the unpalatable flavor without destroying the nourishing medicinal qualities of the vegetable juices.

With the above recited and other objects in view, reference is had to the following specification in which there is set forth one example or embodiment of the invention while the appended claims define the actual scope of the invention.

The process or method consists in incorporating the juices of two pounds of green vegetables into one pound of the finishing candy in the following manner:

The green vegetables are pressed and the juice which is extracted, weighing about one and one-quarter pounds, is boiled with approximately one and one-quarter pounds of granulated sugar and about two ounces of butter. One tablespoonful of barley is cooked with the foregoing ingredients for about five minutes in such a manner that the same may be removed after this period of time. After the removal of the barley, the remaining ingredients are cooked approximately fifteen minutes longer and the mass will produce approximately one pound of candy. By boiling the barley with the other ingredients, the distasteful or unpalatable taste of the green vegetable juice is concealed or disguised, without destroying the nourishing or medicinal qualities of the mineral salts or vitamins contained in the vegetable juice.

It thus follows that a confection or candy is produced which is toothsome and which nevertheless conveys to the consumer the nourishing and medicinal qualities which are contained in the vegetable.

What is claimed is:

1. A method of producing a candy which includes as an ingredient, an initially extracted uncooked vegetable juice, consisting in incorporating said juice in the candy by cooking of the same with the candy, and by cooking with the candy and said juice for a predetermined period of time, a substance for concealing the unpalatable flavor without destroying the nourishing or medicinal qualities of the vegetable juice.

2. The method of producing a candy which includes as an ingredient, an initially extracted uncooked vegetable juice, consisting in incorporating said juice in the candy by cooking the same therewith, and by cooking with the candy and said juice for a predetermined period of time, barley for concealing the unpalatable flavor of the vegetable juice without destroying the nourishing or medicinal qualities thereof.

Signed at New York in the county of New York and State of New York this 12th day of December, A. D. 1927.

IRMA HUYS VANDER GHEYNST.